United States Patent
Hutton

(10) Patent No.: US 7,669,269 B2
(45) Date of Patent: Mar. 2, 2010

(54) SYSTEM AND METHOD FOR WIRELESS COMMUNICATION BETWEEN AN AIRCRAFT AND A PASSENGER BOARDING BRIDGE

(75) Inventor: Neil Hutton, Ottawa (CA)

(73) Assignee: DEW Engineering and Development ULC, Ottawa, Ontario (CA)

( * ) Notice: Subject to any disclaimer, the term of this patent is extended or adjusted under 35 U.S.C. 154(b) by 781 days.

(21) Appl. No.: 11/519,968

(22) Filed: Sep. 13, 2006

(65) Prior Publication Data

US 2008/0065271 A1 Mar. 13, 2008

(51) Int. Cl.
*E01D 15/00* (2006.01)
(52) U.S. Cl. .................. 14/71.5; 340/686.2; 340/686.6; 340/958; 250/206.1
(58) Field of Classification Search .................. 14/71.5; 340/686.2, 686.6, 958; 250/206.1
See application file for complete search history.

(56) References Cited

U.S. PATENT DOCUMENTS

| | | | |
|---|---|---|---|
| 6,637,063 B1 | 10/2003 | Hutton et al. | |
| 6,742,210 B2 | 6/2004 | Hutton et al. | |
| 6,757,927 B2 | 7/2004 | Hutton et al. | |
| 6,907,635 B2 | 6/2005 | Hutton et al. | |
| 2006/0028351 A1* | 2/2006 | Lewis | ...................... 340/686.6 |
| 2006/0277699 A1 | 12/2006 | Hutton | |
| 2006/0287780 A1 | 12/2006 | Hutton | |
| 2006/0288502 A1 | 12/2006 | Hutton | |
| 2006/0288503 A1 | 12/2006 | Hutton | |
| 2007/0214583 A1 | 9/2007 | Hutton | |
| 2008/0098539 A1 | 5/2008 | Hutton | |

* cited by examiner

*Primary Examiner*—Raymond W Addie
(74) *Attorney, Agent, or Firm*—Freedman & Associates

(57) ABSTRACT

A method of aligning one end of a passenger boarding bridge with a doorway of an aircraft includes a step of parking the aircraft within a parking space that is defined adjacent to the passenger boarding bridge. Human intelligible information visually displayed proximate the parking space is determined, the human-intelligible information being uniquely associated with the passenger boarding bridge. Using an input device that is disposed aboard the aircraft, the human-intelligible information is provided to a communication module that is also disposed aboard the aircraft. A signal including the human-intelligible information is transmitted from the communication module to a receiver that is in communication with the passenger boarding bridge. Only signals determined to include the human-intelligible information are accepted as valid signals during a current bridge alignment operation.

26 Claims, 8 Drawing Sheets

SYSTEM AND METHOD FOR WIRELESS COMMUNICATION BETWEEN AN AIRCRAFT AND A PASSENGER BOARDING BRIDGE

FIELD OF THE INVENTION

The instant invention relates to passenger boarding bridges, and more particularly to a method and system for initiating wireless communication between an aircraft and a controller of a passenger boarding bridge.

BACKGROUND

In order to make aircraft passengers comfortable, and in order to transport them between an airport terminal building and an aircraft in such a way that they are protected from the weather and from other environmental influences, passenger boarding bridges are used which are telescopically extensible and the height of which is adjustable. For instance, an apron drive bridge includes a plurality of adjustable modules, including: a rotunda, a telescopic tunnel, a bubble section, a cab, and elevating columns with wheel carriage. Other common types of passenger boarding bridges include radial drive bridges and over-the-wing (OTW) bridges. These types of passenger boarding bridges are adjustable, for instance to compensate for different sized aircraft and to compensate for imprecise parking of aircraft at an airport terminal.

A manual bridge alignment system requires that a human operator is present to perform the alignment operation each time an aircraft arrives. Delays occur when the human operator is not standing-by to perform the alignment operation as soon as the aircraft comes to a stop. In addition, human operators are prone to errors that result in the passenger boarding bridge being driven into the aircraft or into a piece of ground service equipment. Such collisions involving the passenger boarding bridge are costly and also result in delays. In order to avoid causing a collision, human operators tend to err on the side of caution and drive the passenger boarding bridge slowly and cautiously.

Semi-automated bridge alignment systems also require a human operator, but the human operator may be present at a remote location and interact with the bridge control system in a tele-robotic manner. One human operator may interact with a plurality of different passenger boarding bridges, thereby reducing the costs associated with training and paying the salaries of human operators. Alternatively, certain movements of the bridge are automated, whilst other movements are performed under the control of the human operator.

Automated bridge alignment systems provide a number of advantages compared to manual and semi-automated systems. For instance, automated bridge alignment systems do not require a human operator, and therefore the costs that are associated with training and paying the salaries of human operators are reduced or eliminated. Furthermore, an automated bridge alignment system is always standing by to control the passenger boarding bridge as soon as an aircraft comes to a stop. Accordingly, delays associated with dispatching a human operator to perform a bridge alignment operation are eliminated, particularly during periods of heavy aircraft traffic.

Early attempts at automated bridge alignment systems employed imagers and sensors disposed on or about the passenger boarding bridge, for sensing locations of aircraft doorways and for sensing close approach of the bridge to the aircraft. More recently, automated bridge alignment systems have been developed in which beacon docking signals and/or control signals are transmitted wirelessly between an aircraft and a passenger boarding bridge, as described for example in U.S. Pat. Nos. 6,637,063, 6,742,210, 6,757,927 and 6,907,635, the entire contents of all of which are incorporated herein by reference. Other systems relying upon wireless transmission of signals between an aircraft and a passenger boarding bridge during alignment are disclosed in U.S. patent application Ser. Nos. 11/149,401, 11/155,502, 11/157,934 and 11/157,938, the entire contents of all of which are incorporated herein by reference.

Unfortunately, automated bridge alignment systems still are susceptible to errors that result in the passenger boarding bridge being driven into the aircraft. For instance, in a system in which an aircraft wirelessly transmits a call signal for initiating an automated alignment operation of a passenger boarding bridge, it is possible that one or more neighboring passenger boarding bridges may intercept and act upon the call signal as well. In this case, an aircraft may inadvertently initiate automated docking of more than one passenger boarding bridge at time. As a result, the neighboring bridges may collide with aircraft or ground service equipment located adjacent thereto, particularly since the bridge movement is sudden and unexpected. Similarly, control signals and/or confirmation signals that are exchanged between an aircraft and an assigned passenger boarding bridge may be intercepted and acted upon by other passenger boarding bridges in close proximity to the assigned passenger boarding bridge. With the growing number of automated bridge alignment systems that are in use at airports, the problem of cross-talk related bridge incidents is becoming more of a concern.

In U.S. patent application Ser. No. 11/373,976, Hutton teaches the use of unique aircraft identifier codes for encoding signals for transmission between an aircraft and a controller of an automated bridge alignment system. Since no two aircraft have the same unique aircraft identifier code, a message that is encoded with a particular unique aircraft identifier code may be positively identified as originating from a particular aircraft. When it is determined that the message has originated from a particular aircraft that is assigned to the passenger boarding bridge, then the controller of the automated bridge alignment system accepts the message as a valid message to be acted upon during a current bridge alignment operation. Optionally, messages transmitted to the aircraft from the controller are also encoded using the same unique aircraft identifier code. The system and method using unique aircraft identifier codes is useful and supports very secure communication between aircraft and ground based bridge control systems. Accordingly, the system and method addresses the problem of cross-talk related bridge incidents. However, the unique aircraft identifier code for every aircraft that is assigned to a passenger boarding bridge must be provided in advance to the controller of the automated bridge alignment system. Last minute gate assignment changes may result in an aircraft arriving at a passenger boarding bridge "unannounced," such that the controller of the automated bridge alignment system does not recognize messages transmitted therefrom as valid messages to be acted upon during a current bridge alignment operation. In addition, some aircraft may not have a unique aircraft identifier.

SUMMARY OF EMBODIMENTS OF THE INVENTION

In accordance with an aspect of the instant invention there is provided a method of aligning one end of a passenger boarding bridge with a doorway of an aircraft, a parking space being defined adjacent to the passenger boarding bridge within which parking space the aircraft is parked during a current alignment operation, the method comprising: parking the aircraft within the parking space; determining human intelligible information visually displayed proximate the parking space, the human-intelligible information being uniquely associated with the passenger boarding bridge; using an input device that is disposed aboard the aircraft, providing the human-intelligible information to a communication module that is also disposed aboard the aircraft; and, transmitting a signal including the human-intelligible information from the communication module to a receiver that is in communication with the passenger boarding bridge.

In accordance with another aspect of the instant invention there is provided a method of aligning one end of a passenger boarding bridge with a doorway of an aircraft, a parking space being defined adjacent to the passenger boarding bridge within which parking space the aircraft is parked during a current alignment operation, the method comprising: providing a passenger boarding bridge including a bridge alignment control system; associating a unique identifier with the passenger boarding bridge; displaying a target at a location that is proximate the passenger boarding bridge, the target comprising human-intelligible information relating to the unique identifier; using a receiver that is in communication with the bridge alignment control system, receiving a wireless signal transmitted from the aircraft; processing the wireless signal to determine data relating to the unique identifier within the wireless signal; and, accepting the wireless signal as a control signal for a current bridge alignment operation when it is determined that the wireless signal includes the data relating to the unique identifier.

In accordance with another aspect of the instant invention there is provided a system for aligning one end of a passenger boarding bridge with a doorway of an aircraft, a parking space being defined adjacent to the passenger boarding bridge within which parking space the aircraft is parked during a current alignment operation, the system comprising: a target disposed at a location that is proximate the passenger boarding bridge and comprising human-intelligible information that is indicative of a unique identifier associated with the passenger boarding bridge; an input device disposed aboard the aircraft for receiving from a user an input signal relating to the human-intelligible information that is indicative of the unique identifier associated with the passenger boarding bridge; a communication module disposed aboard the aircraft and in communication with the input device, the communication module for encoding a signal with the unique identifier and for wirelessly transmitting the encoded signal; a receiver disposed at a location that is remote from the aircraft for receiving the encoded signal; and, a processor in communication with the receiver for processing the received signal for determining whether or not the received signal is encoded with a unique identifier associated with the passenger boarding bridge having the one end.

BRIEF DESCRIPTION OF THE DRAWINGS

Exemplary embodiments of the invention will now be described in conjunction with the following drawings, in which similar reference numbers designate similar items.

DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
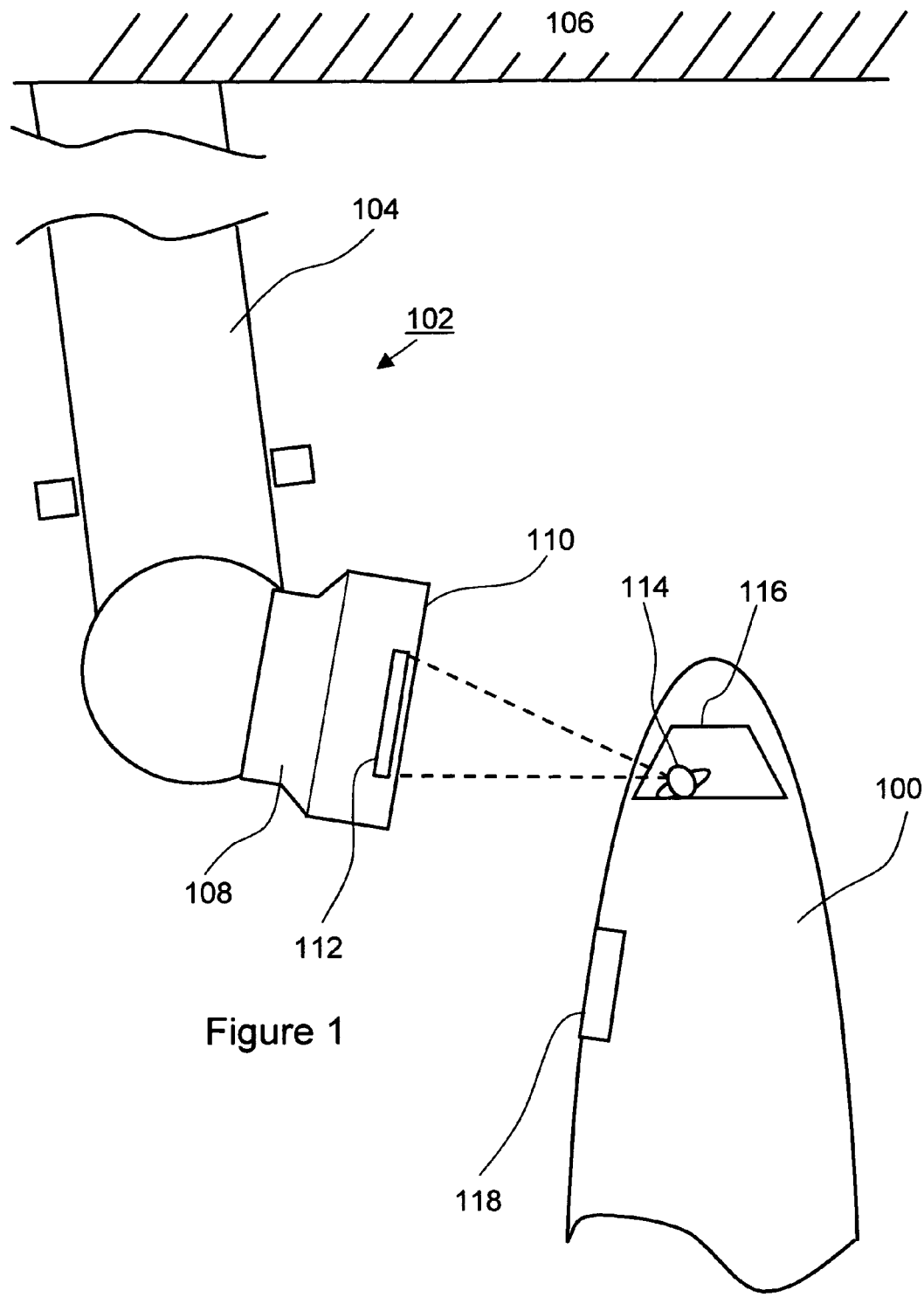
FIG. 1 is a simplified top view showing a user aboard an aircraft viewing a target mounted to a passenger boarding bridge.

Referring to FIG. 1, shown is a simplified top view of a user aboard an aircraft viewing a target that is mounted to a passenger boarding bridge. The aircraft 100 is within or proximate a parking space that is defined adjacent to the passenger boarding bridge 102. The passenger boarding bridge 102 includes a passageway 104 extending between a terminal building 106 and a pivotal cabin 108. The pivotal cabin 108 is open at an aircraft-engaging end 110 thereof. A target 112 including human-intelligible information, which is uniquely associated with the passenger boarding bridge 102, is mounted adjacent to an upper surface of the pivotal cabin 108 and near the aircraft-engaging end 110. The target 112 is mounted so as to be visible to a user 114 that is disposed aboard the aircraft 100, when the aircraft 100 is within or proximate the parking space. For instance, user 114 views the target 112 through the window 116 of aircraft 100. The target 112 is also mounted so as to be substantially obscured from view by the user 114 when the aircraft 100 is not proximate the parking space. Optionally, a not illustrated shroud is provided around the target 112 so as to restrict the area from which the target 112 is viewable. Optionally, a film or a screen is disposed in front of the target 112 so as to prevent viewing of the target 112 from a location that is outside of a predetermined viewing area. Restricting the area from which the target 112 is viewable reduces the likelihood of the target 112 being viewed accidentally by a user aboard an aircraft that is approaching another passenger boarding bridge. In other words, there is a high confidence level that only a user aboard an aircraft that is within or proximate the parking space immediately adjacent to passenger boarding bridge 102 will view the target 112. Optionally, the user 114 views the target from another location aboard the aircraft 100, such as for instance through a window of doorway 118 or through another window along the side of aircraft 100.

After viewing the human-intelligible information, the user 114 uses a not-illustrated user input device aboard the aircraft to provide the human-intelligible information to a processor of a not illustrated communication module aboard the aircraft. The processor encodes a signal to include the human-intelligible information and provides the encoded signal to a transmitter of the communications module for wireless transmission to a not illustrated receiver that is in communication with the passenger boarding bridge. Optionally the communication module aboard the aircraft is one of an integrated unit including the processor and the transmitter, and separate processor and transmitter components that are in communication one with the other.

The encoded signal is received at a location that is remote from the aircraft using the not illustrated receiver, such as for instance a receiver of a communication module disposed aboard the passenger boarding bridge and near the aircraft-engaging end 110. Before a received signal is accepted as a valid signal, a not illustrated processor of the communication module determines whether the signal includes the human-intelligible information. If the signal includes the human-intelligible information then the signal is accepted as a valid signal, but if the signal does not include the human-intelligible information then the signal is not accepted as a valid signal. When the signal that is accepted comprises a call signal or a command signal, then automated alignment is initiated or the bridge performs an action as specified by the command, respectively. When the signal is not accepted, then optionally an error signal is returned to the aircraft, or a page is sent requesting a human bridge operator to perform manual alignment of the passenger boarding bridge 102. Optionally, the encoded signal is transmitted as one of a radio frequency signal and an optical signal. Optionally, encoding a signal includes obfuscating the signal and further optionally encoding a signal includes encrypting the signal using the human-intelligible information as an encryption key. Optionally the communication module aboard the passenger boarding bridge is one of an integrated unit including the processor and the transmitter, and separate processor and transmitter components that are in communication one with the other.

By way of a specific and non-limiting example, the target 112 includes human-intelligible information in the form of an alpha-numeric string of characters that is unique to the specific passenger boarding bridge carrying the target 112. For instance, the alpha-numeric string of characters comprises a unique bridge identifier for encoding signals for transmission between the aircraft and the passenger boarding bridge. Optionally, the alpha-numeric string of characters includes a portion for identifying the specific airport, a portion for identifying the specific terminal of the airport and a portion for identifying the specific passenger boarding bridge. Optionally, the alpha-numeric string of characters also contains a check digit portion for verifying accurate entry of the human-intelligible information via the user input device that is disposed aboard the aircraft. Optionally, the alpha-numeric string of characters merely contains a portion for distinguishing the specific passenger boarding bridge from other nearby passenger boarding bridges at an airport, as well as a check digit portion for verifying accurate entry of the human-intelligible information via the user input device that is disposed aboard the aircraft. Further optionally, the human-intelligible information is not displayed within target 112 in the form of an alpha-numeric string of characters. For instance, the human-intelligible information is displayed as a series of geometric shapes or using other recognizable symbols. Of course, the user input device is adapted according to the form of the human-intelligible information.

Optionally, the target 112 is illuminated and/or reflective for improved viewing under conditions of poor lighting and/or weather.

Optionally, a plurality of different unique bridge identifiers is associated with each passenger boarding bridge 102. In this case the target 112 includes a plurality of information display portions, each one containing a different unique bridge identifier for being selectably displayed during different bridge alignment operations. For instance, the target 112 contains alpha-numeric strings of characters on both sides thereof, and flips over to selectably display different strings of characters during different bridge alignment operations. Associating a plurality of unique bridge identifiers with each passenger boarding bridge reduces the chances of an aircraft using a previously obtained identifier during a later bridge alignment operation. Optionally, the number of unique bridge identifiers per passenger boarding bridge is greater than two.

Figure 2:
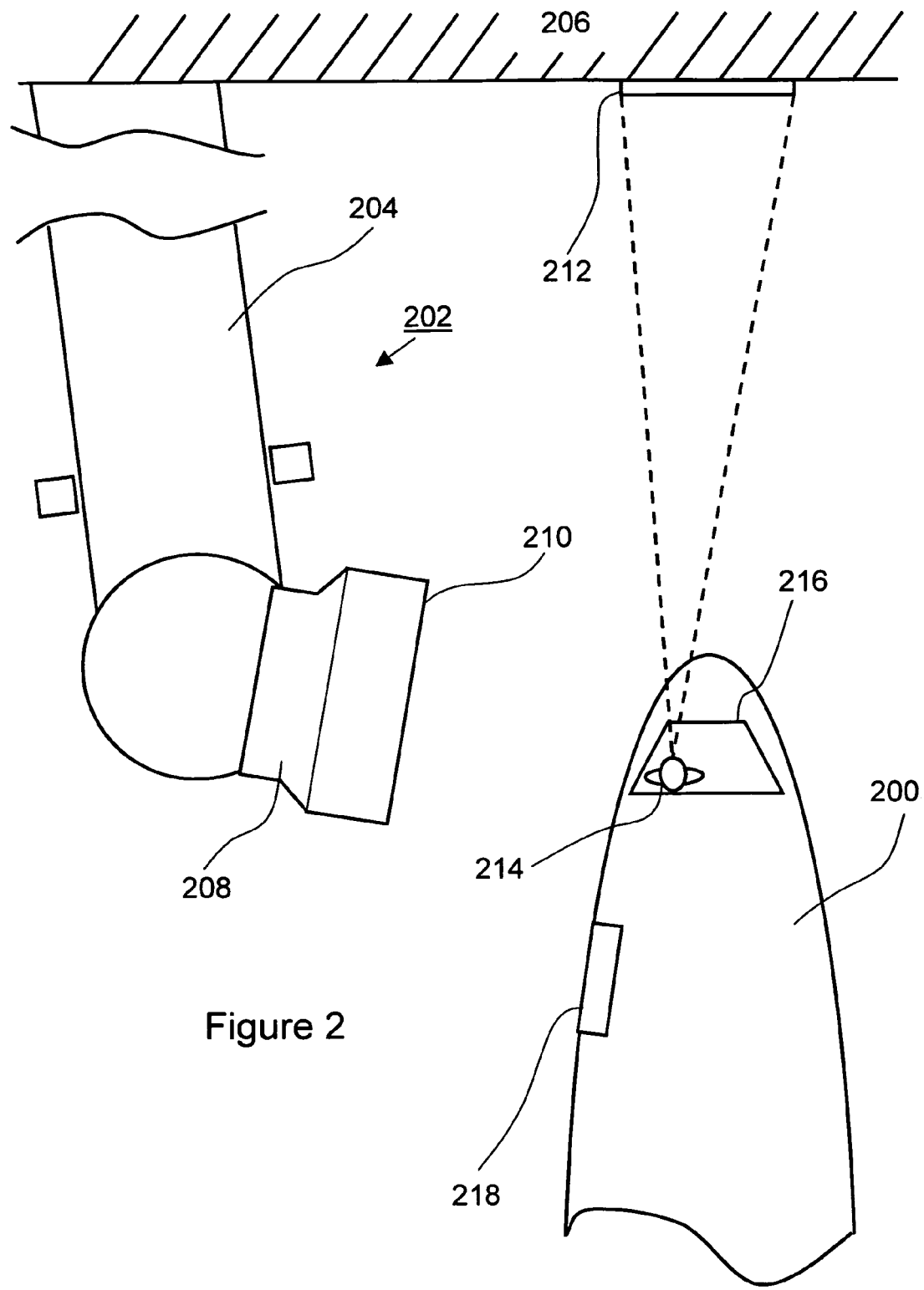
FIG. 2 is a simplified top view showing a user aboard an aircraft viewing a target that is provided in the form of a visual guidance docking system (VGDS) display portion, the VGDS mounted to a surface of the terminal building.

Referring now to FIG. 2, shown is a simplified top view of a user aboard an aircraft viewing a target that is provided in the form of a visual guidance docking system (VGDS) display portion. The aircraft 200 is within or proximate a parking space that is defined adjacent to a passenger boarding bridge 202. The passenger boarding bridge 202 includes a passageway 204 extending between a terminal building 206 and a pivotal cabin 208. The pivotal cabin 208 is open at an aircraft-engaging end 210 thereof. A target 212 in the form of a display portion of a visual guidance docking system (VGDS) is mounted adjacent to an outside surface of the terminal building 206. Optionally, the VGDS is pole mounted. The target 212 is for displaying to a user 214 aboard the aircraft human-intelligible information, which is uniquely associated with the passenger boarding bridge 202. The target 212 is mounted so as to be visible to the user 214 when the aircraft 200 is within or proximate the parking space. The target 212 is also mounted so as to be substantially obscured from view when the aircraft 200 is not proximate the parking space. Optionally, a not illustrated shroud is provided around the target 212 so as to restrict the area from which the target 212 is viewable. Optionally, a film or a screen is disposed in front of the target 212 so as to prevent viewing of the target 212 from a location that is outside of a predetermined viewing area. Restricting the area from which the target 212 is viewable reduces the likelihood of the target 212 being viewed accidentally by a user aboard an aircraft that is approaching another passenger boarding bridge. In other words, there is a high confidence level that only a user aboard an aircraft that is within or proximate the parking space immediately adjacent to passenger boarding bridge 202 will view the target 212.

After viewing the human-intelligible information, the user 214 uses a not-illustrated user input device aboard the aircraft to provide the human-intelligible information to a processor of a not illustrated communication module aboard the aircraft. The processor encodes a signal to include the human-intelligible information and provides the encoded signal to a transmitter of the communications module for wireless transmission to a not illustrated receiver that is in communication with the passenger boarding bridge. The encoded signal is received at a location that is remote from the aircraft using the not illustrated receiver, such as for instance a receiver disposed aboard the passenger boarding bridge and near the aircraft-engaging end 210. Before a received signal is accepted as a valid signal, a not illustrated processor in communication with the receiver determines whether the signal includes the human-intelligible information. If the signal includes the human-intelligible information then the signal is accepted as a valid signal, but if the signal does not include the human-intelligible information then the signal is not accepted as a valid signal. When the signal that is accepted comprises a call signal or a command signal, then automated alignment is initiated or the bridge performs an action as specified by the command, respectively. When the signal is not accepted, then optionally an error signal is returned to the aircraft, or a page is sent requesting a human bridge operator to perform manual alignment of the passenger boarding bridge 102. Optionally, the encoded signal is transmitted as one of a radio frequency signal and an optical signal. Optionally, encoding a signal includes obfuscating the signal and further optionally encoding a signal includes encrypting the signal using the human-intelligible information as an encryption key.

By way of a specific and non-limiting example, the target 112 includes human-intelligible information in the form of an alpha-numeric string of characters that is unique to the specific passenger boarding bridge that is associated with the VGDS. For instance, the alpha-numeric string of characters comprises a unique bridge identifier for encoding signals for transmission between the aircraft and the passenger boarding bridge. Optionally, the alpha-numeric string of characters includes a portion for identifying the specific airport, a portion for identifying the specific terminal of the airport and a portion for identifying the specific passenger boarding bridge. Optionally, the alpha-numeric string of characters also contains a check digit portion for verifying accurate entry of the human-intelligible information via the user input device that is disposed aboard the aircraft. Optionally, the alpha-numeric string of characters merely contains a portion for distinguishing the specific passenger boarding bridge from other nearby passenger boarding bridges at an airport, as well as a check digit portion for verifying accurate entry of the human-intelligible information via the user input device that is disposed aboard the aircraft. Further optionally, the human-intelligible information is not displayed within target 212 in the form of an alpha-numeric string of characters. For instance, the human-intelligible information is displayed as a series of geometric shapes or using other recognizable symbols. Of course, the user input device is adapted according to the form of the human-intelligible information.

Optionally, a plurality of different unique bridge identifiers is associated with each passenger boarding bridge 202. In this case the target 212 selectably displays different unique bridge identifiers during different bridge alignment operations.

Figure 3:
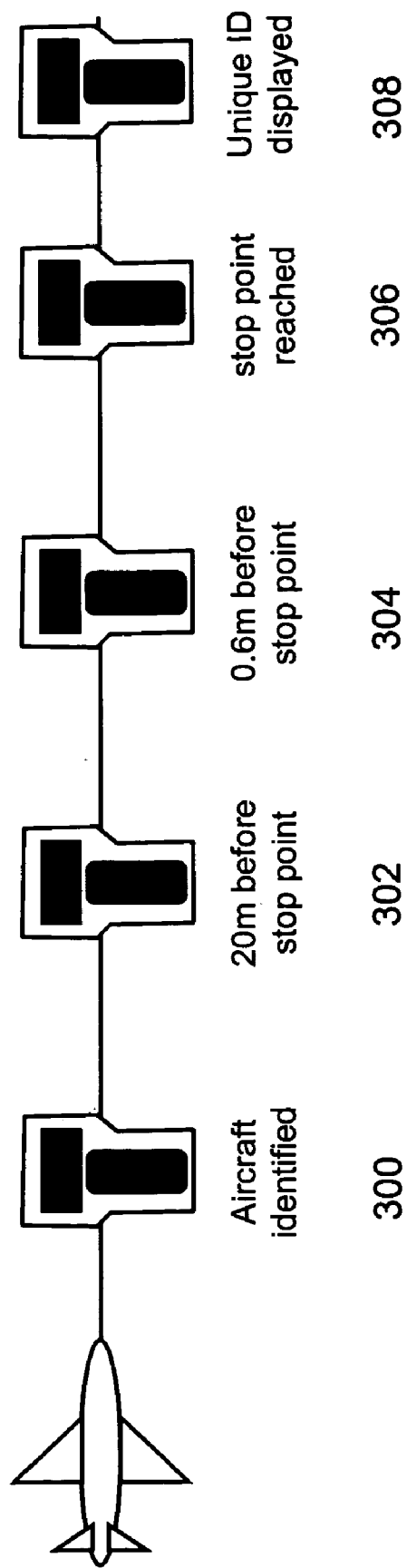
FIG. 3 is a simplified schematic illustration showing a series of images displayed by a VGDS as an aircraft approaches a final stopping position within a parking space.

Referring now to FIG. 3, shown is a schematic illustration of a series of images displayed by a VGDS as an aircraft approaches a final stopping position within a parking space. At 300 the aircraft type is identified and is displayed to the pilot using display portion of VGDS. At 302 distance and azimuthal information is displayed for guiding the aircraft 200 toward a final stopping position within the parking space. At 304 distance and azimuthal information is displayed as the aircraft 200 continues to approach the final stopping position. At 306 an indication is provided to stop the aircraft. At step 308, after the stop indication is cleared from the display, the unique bridge identifier is provided in human-intelligible form, such as for instance the alpha-numeric string of characters "YA34."

Figure 4A:
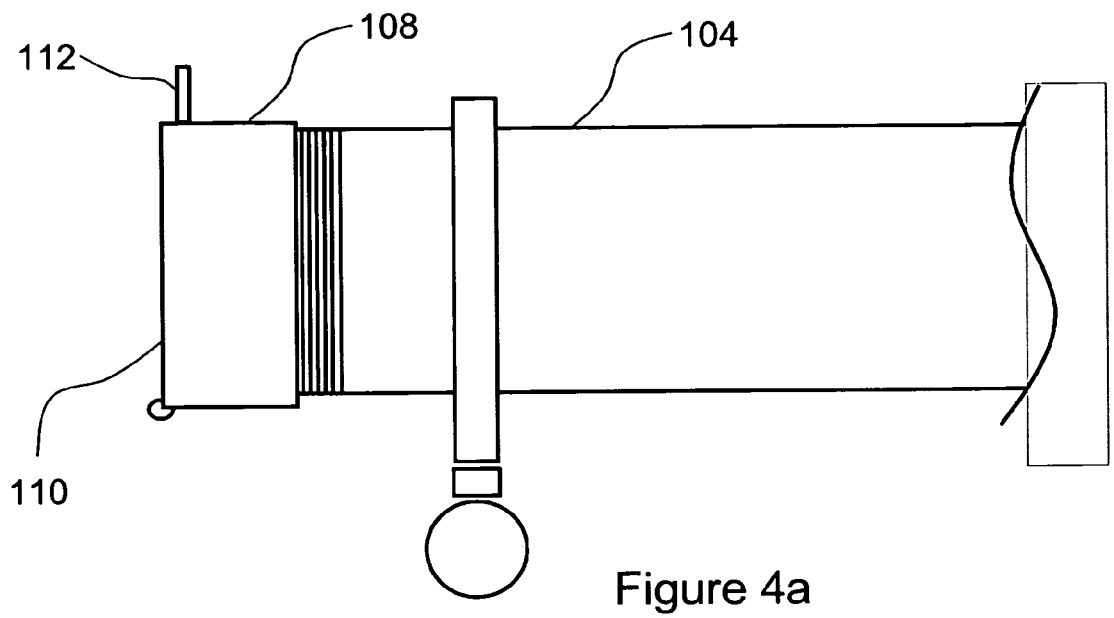
FIG. 4a is a simplified side view showing an aircraft-engaging end of a passenger boarding bridge, including a human-intelligible target that is mounted adjacent a top surface of a pivotal cabin.

Referring now to FIG. 4a, shown is a simplified side view of an aircraft-engaging end of a passenger boarding bridge, including a human-intelligible target that is mounted adjacent a top surface of a pivotal cabin. An extensible canopy, which is normally provided at the aircraft-engaging end 110 of pivotal cabin 108, is omitted in FIG. 4a. The extensible canopy typically is fabricated from a sturdy and flexible material, and is carried on a frame for providing a substantially weather-tight seal between the exterior of the aircraft and the aircraft-engaging end 110 of pivotal cabin 108. Accordingly, placement of the target 112 adjacent the top surface of pivotal cabin 108 is subject to the design of such an extensible canopy, when present.

Figure 4B:
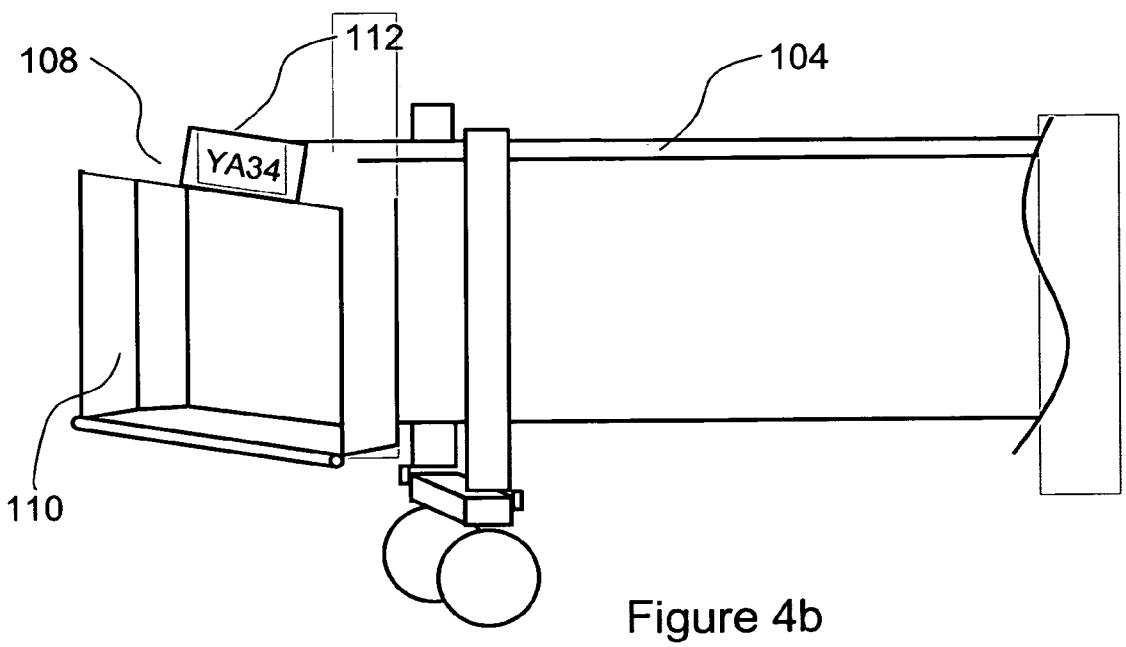
FIG. 4b is a simplified side-elevational view showing an aircraft-engaging end of a passenger boarding bridge, including a human-intelligible target that is mounted adjacent a top surface of a pivotal cabin.

Referring now to FIG. 4b, shown is a simplified side-elevational view of an aircraft-engaging end of a passenger boarding bridge, including a human-intelligible target that is mounted adjacent a top surface of a pivotal cabin. FIG. 4b is representative of the orientation of the pivotal cabin 108 relative to passageway 104 prior to aircraft 102 entering the parking space adjacent to passenger boarding bridge 102. In particular, the aircraft-engaging end 110 faces generally toward the direction of aircraft approach to the parking space. Accordingly, the target 112 is presented for being viewed by user 114 as the aircraft approaches the parking space.

Figure 5A:
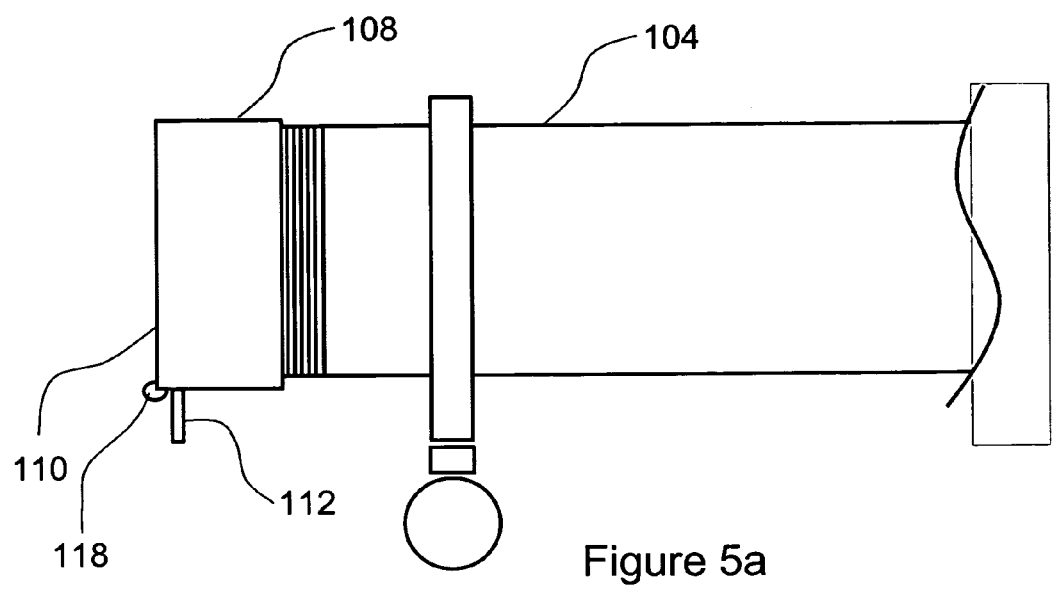
FIG. 5a is a simplified side view showing an aircraft-engaging end of a passenger boarding bridge, including a human-intelligible target that is mounted adjacent a lower surface of a pivotal cabin.

Referring now to FIG. 5a, shown is a simplified side view of an aircraft-engaging end of a passenger boarding bridge, including a human-intelligible target that is mounted adjacent a lower surface of a pivotal cabin. A bumper element 118, which is normally provided adjacent the floor surface of the aircraft-engaging end 110 of pivotal cabin 108, is shown in FIG. 5a. Accordingly, placement of the target 112 adjacent the lower surface of pivotal cabin 108 is subject to the design of such a bumper element 118, when present.

Figure 5B:
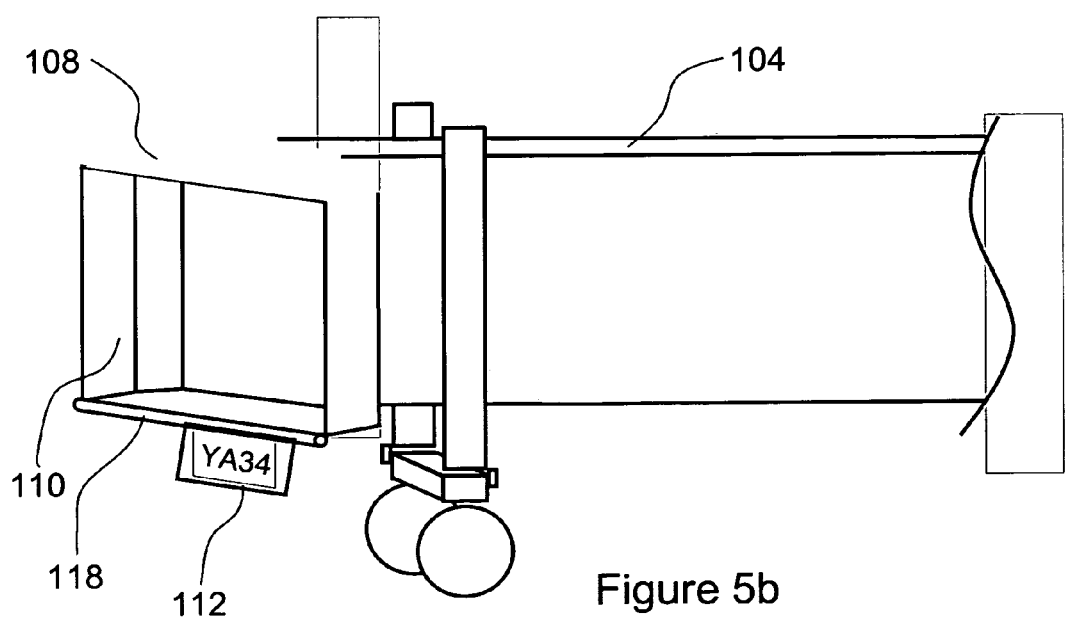
FIG. 5b is a simplified side-elevational view showing an aircraft-engaging end of a passenger boarding bridge, including a human-intelligible target that is mounted adjacent a lower surface of a pivotal cabin.

Referring now to FIG. 5b, shown is a simplified side-elevational view of an aircraft-engaging end of a passenger boarding bridge, including a human-intelligible target that is mounted adjacent a lower surface of a pivotal cabin. FIG. 5b is representative of the orientation of the pivotal cabin 108 relative to passageway 104 prior to aircraft 102 entering the parking space adjacent to passenger boarding bridge 102. In particular, the aircraft-engaging end 110 faces generally toward the direction of aircraft approach to the parking space. Accordingly, the target 112 is presented for being scanned by user 114 as the aircraft approaches the parking space.

Figure 6:
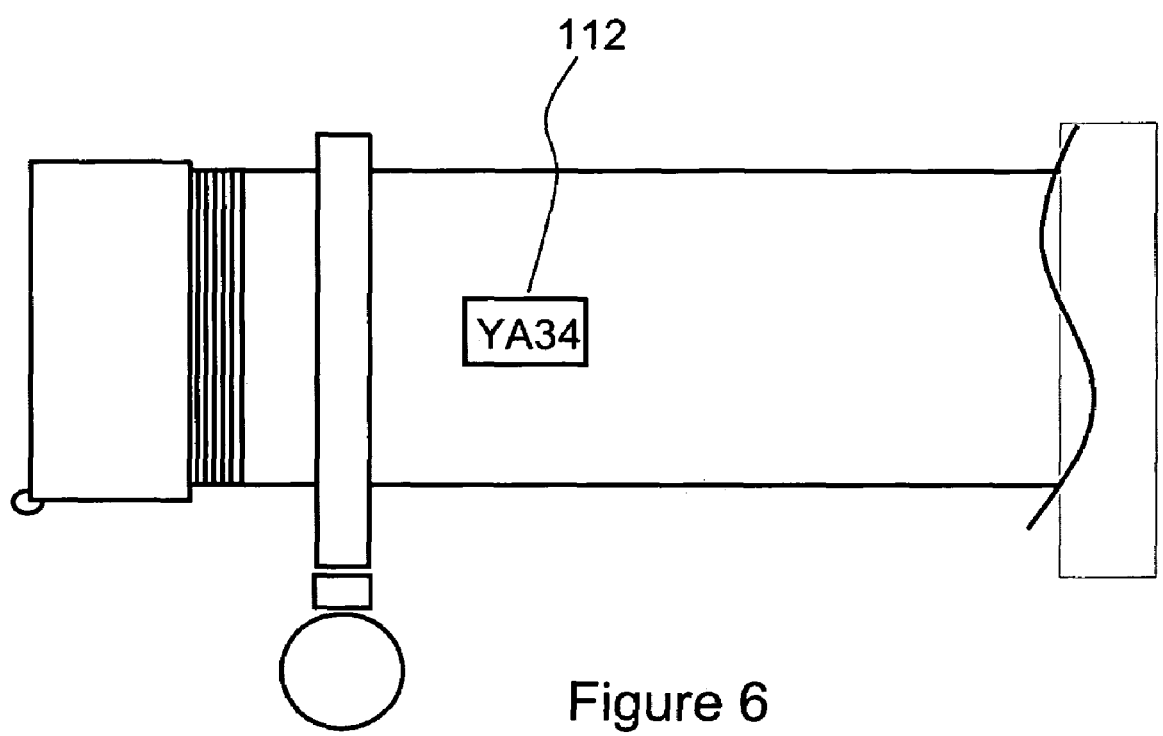
FIG. 6 is a simplified side view showing an aircraft-engaging end of a passenger boarding bridge, including a human-intelligible target that is mounted adjacent a lateral surface of a passageway of the passenger boarding bridge.

Referring now to FIG. 6, shown is a simplified side view of an aircraft-engaging end of a passenger boarding bridge, including a machine readable target that is mounted adjacent a lateral surface of a passageway of the passenger boarding bridge. FIG. 6 is one non-limiting example of an alternate placement of target 112. Other alternate placements include an exterior surface of terminal building 106, on a mounting structure extending from a surface of the passenger boarding bridge 102, or on a stand or post secured to the apron surface and adjacent to the parking space. The actual placement of the target 112 is important only in so far as there is a direct line-of-sight between the user 114 and the target 112 when the aircraft 100 enters the parking space adjacent the passenger boarding bridge 102.

Figure 7:
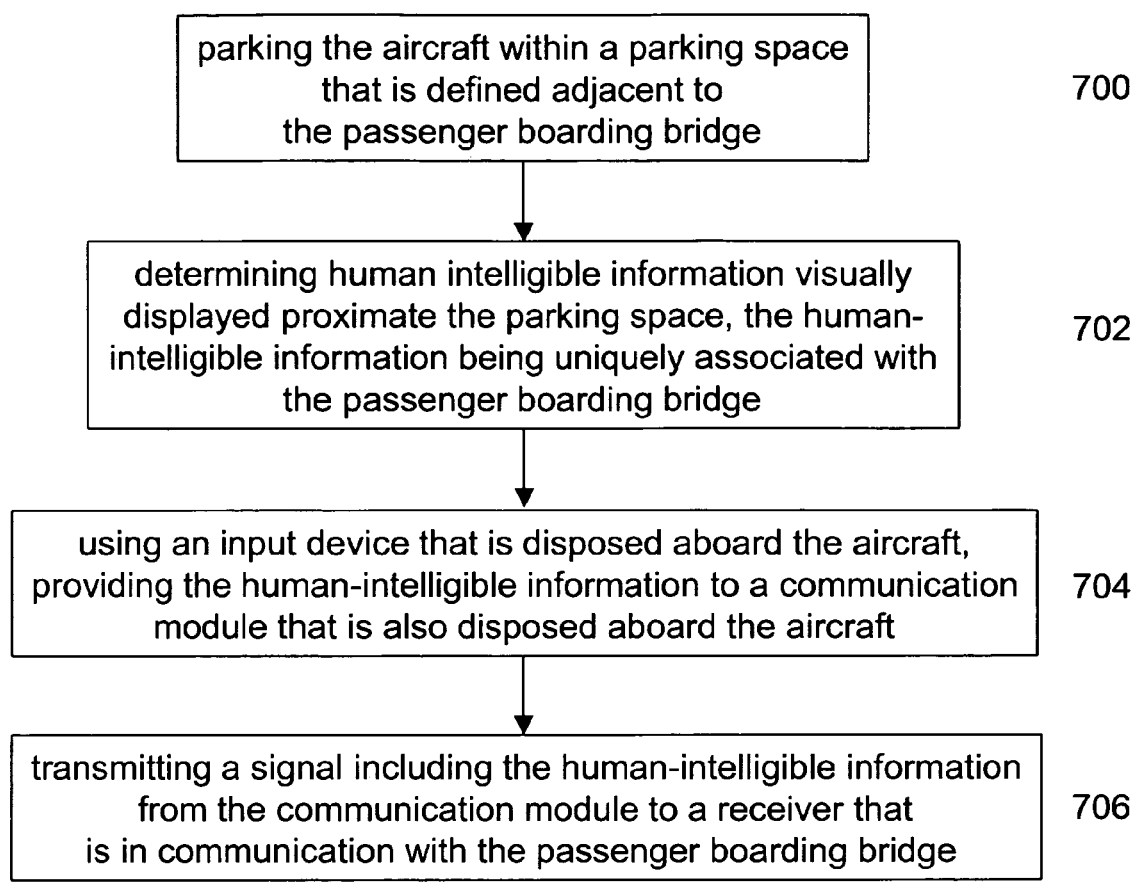
FIG. 7 is a simplified flow diagram of a method for aligning one end of a passenger boarding bridge with a doorway of an aircraft, according to an embodiment of the instant invention; and, FIG. 8 is a simplified flow diagram of a method for aligning one end of a passenger boarding bridge with a doorway of an aircraft, according to an embodiment of the instant invention.

Referring now to FIG. 7, shown is a simplified flow diagram of a method for aligning one end of a passenger boarding bridge with a doorway of an aircraft, according to an embodiment of the instant invention. At step 700 the aircraft is parked within a parking space adjacent to the passenger boarding bridge. At step 702 human intelligible information visually displayed proximate the parking space is determined, the human-intelligible information being uniquely associated with the passenger boarding bridge. At step 704, using an input device that is disposed aboard the aircraft, the human-intelligible information is provided to a communication module that is also disposed aboard the aircraft. At step 706 a signal including the human-intelligible information is transmitted from the communication module to a receiver that is in communication with the passenger boarding bridge.

Figure 8:
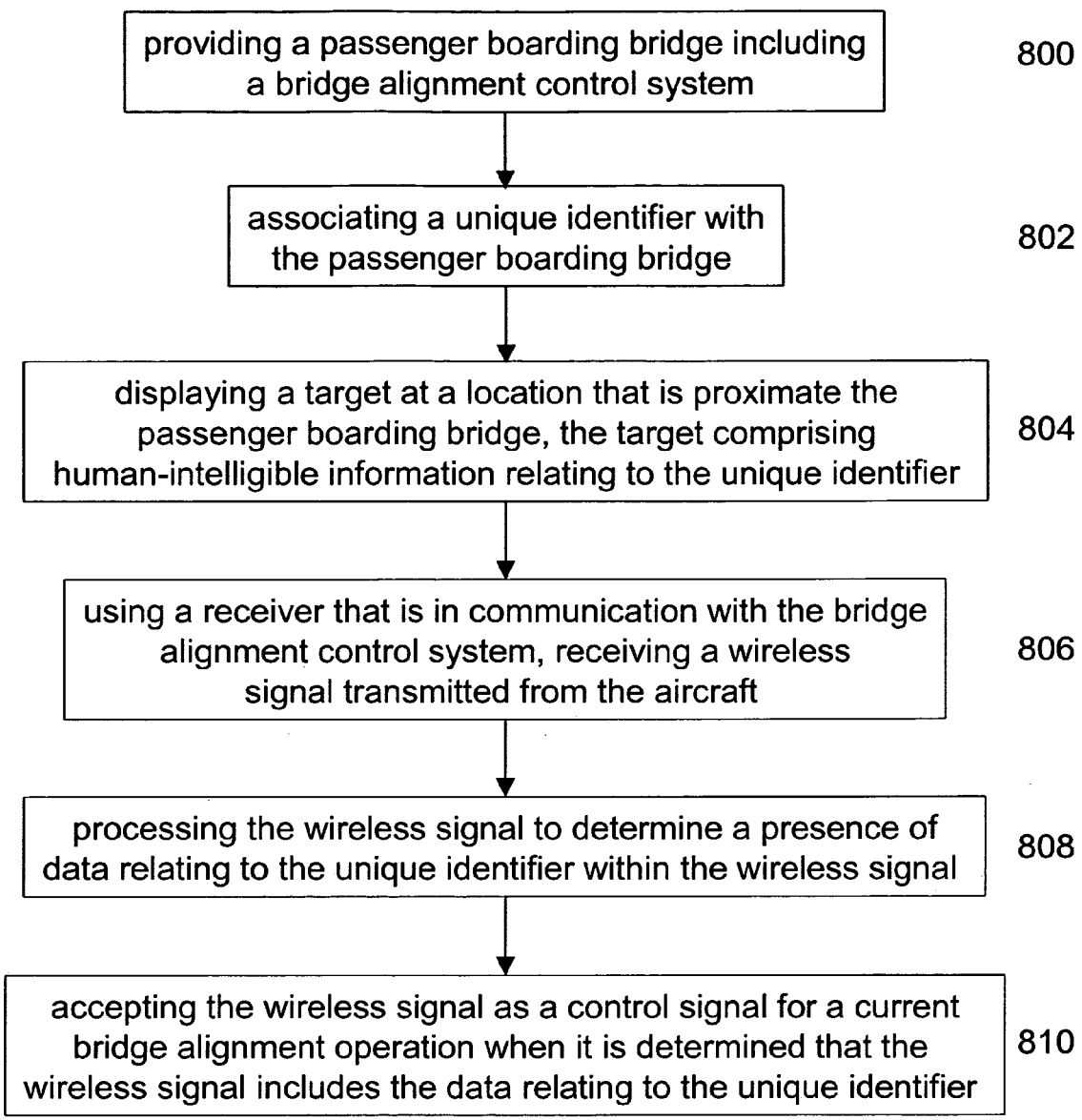

Referring now to FIG. 8, shown is a simplified flow diagram of a method for aligning one end of a passenger boarding bridge with a doorway of an aircraft, according to an embodiment of the instant invention. At step 800 a passenger boarding bridge is provided, the passenger boarding bridge including a bridge alignment control system. At step 802 a unique identifier is associated with the passenger boarding bridge. At step 804 a target is displayed at a location that is proximate the passenger boarding bridge, the target comprising human-intelligible information relating to the unique identifier. At step 806 a wireless signal transmitted from the aircraft is received using a receiver that is in communication with the bridge alignment control system. At step 808 the wireless signal is processed to determine a presence of data relating to the unique identifier within the wireless signal. At step 810 the wireless signal is accepted as a control signal for a current bridge alignment operation when it is determined that the wireless signal includes the data relating to the unique identifier.

Numerous other embodiments may be envisaged without departing from the spirit and scope of the invention.

What is claimed is:

1. A method of initiating wireless communication between an aircraft and a controller of a passenger boarding bridge, a parking space being defined adjacent to the passenger boarding bridge within which parking space the aircraft is parked during a current alignment operation, the method comprising:
   parking the aircraft within the parking space;
   determining human intelligible information visually displayed proximate the parking space, the human-intelligible information being uniquely associated with the passenger boarding bridge;
   using an input device that is disposed aboard the aircraft, providing the human-intelligible information to a communication module that is also disposed aboard the aircraft; and,
   transmitting a signal including the human-intelligible information from the communication module to a receiver that is in communication with the passenger boarding bridge
   wherein the transmitted signal is accepted as a valid signal for the current alignment operation when it is determined that the transmitted signal includes the human intelligible information.

2. A method according to claim 1, wherein the human-intelligible information comprises an alpha-numeric string of characters.

3. A method according to claim 1, wherein the human-intelligible information is indicative of a unique identifier that is associated with the passenger boarding bridge.

4. A method according to claim 1, comprising encoding the signal with the human-intelligible information prior to transmitting the signal.

5. A method according to claim 1, wherein determining human intelligible information is performed by a user disposed aboard the aircraft.

6. A method according to claim 1, wherein transmitting a signal comprises providing control signal data relating to a current bridge alignment operation and attaching the human-intelligible information to the control signal data.

7. A method according to claim 6, wherein the control signal data comprises a call signal for initiating an automated bridge alignment operation.

8. A method according to claim 6, wherein the control signal data comprises an instruction for initiating a movement of the passenger boarding bridge during a current bridge alignment operation.

9. A method according to claim 6, wherein the control signal data comprises a beacon signal for providing an indication of a location of the doorway to which the one end of the passenger boarding bridge is to be aligned.

10. A method according to claim 1, wherein the human intelligible-information is included in the transmitted signal for verifying that the one end of the passenger boarding bridge is being aligned with a doorway of an aircraft that is parked within the parking space adjacent to that passenger boarding bridge.

11. A method of initiating wireless communication between an aircraft and a controller of a passenger boarding bridge, a parking space being defined adjacent to the passenger boarding bridge within which parking space the aircraft is parked during a current alignment operation, the method comprising:
   providing a passenger boarding bridge including a bridge alignment control system;
   associating a unique identifier with the passenger boarding bridge;
   displaying a target at a location that is proximate the passenger boarding bridge, the target comprising human-intelligible information relating to the unique identifier;
   using a receiver that is in communication with the bridge alignment control system, receiving a wireless signal transmitted from the aircraft;
   processing the wireless signal to determine data relating to the unique identifier within the wireless signal; and,
   accepting the wireless signal as a control signal for a current bridge alignment operation when it is determined that the wireless signal includes the data relating to the unique identifier.

12. A method according to claim 11, wherein displaying the target comprises displaying the target such that the target is substantially obscured when viewed from a location outside the aircraft parking space.

13. A method according to claim 11, wherein the target comprises an alpha-numeric string of characters.

14. A method according to claim 11, wherein the control signal comprises a call signal transmitted from the aircraft for initiating an automated bridge alignment operation.

15. A method according to claim 11, wherein the control signal comprises an instruction signal transmitted from the aircraft for initiating a movement of the passenger boarding bridge during a current bridge alignment operation.

16. A method according to claim 11, wherein the control signal comprises a beacon signal transmitted from the aircraft for providing an indication of a location of the doorway to which the one end of the passenger boarding bridge is to be aligned.

17. A system for initiating wireless communication between an aircraft and a controller of a passenger boarding bridge, a parking space being defined adjacent to the passenger boarding bridge within which parking space the aircraft is parked during a current alignment operation, the system comprising:
   a target disposed at a location that is proximate the passenger boarding bridge and comprising human-intelligible information that is indicative of a unique identifier associated with the passenger boarding bridge;

an input device disposed aboard the aircraft for receiving from a user an input signal relating to the human-intelligible information that is indicative of the unique identifier associated with the passenger boarding bridge;

a communication module disposed aboard the aircraft and in communication with the input device, the communication module for encoding a signal with the unique identifier and for wirelessly transmitting the encoded signal;

a receiver disposed at a location that is remote from the aircraft for receiving the encoded signal; and, a processor in communication with the receiver for processing the received signal for determining whether or not the received signal is encoded with a unique identifier associated with the passenger boarding bridge having the one end.

18. A system according to claim 17, wherein the target is mounted adjacent a surface of the passenger boarding bridge.

19. A system according to claim 17, wherein the passenger boarding bridge comprises a pivotal cabin disposed at an outboard end thereof, and wherein the target is mounted adjacent a top surface of the pivotal cabin.

20. A system according to claim 17, wherein the passenger boarding bridge comprises a pivotal cabin disposed at an outboard end thereof, and wherein the target is mounted adjacent a lower surface of the pivotal cabin.

21. A system according to claim 17, wherein the passenger boarding bridge comprises a passageway section having an inboard end and an outboard end, and wherein the target is mounted adjacent a surface of the passageway section.

22. A system according to claim 17, wherein the target includes a plurality of information display portions, each information display portion containing a different unique identifier for being displayed in a selectable fashion.

23. A system according to claim 17, comprising a shroud disposed around a portion of the target for preventing viewing of the target from outside of a predetermined viewing area within or proximate the parking space.

24. A system according to claim 17, comprising one of a film and a screen disposed in front of the target for preventing viewing of the target from outside of a predetermined viewing area within or proximate the parking space.

25. A system according to claim 17, wherein the target comprises a display portion of a visual guidance docking system.

26. A system according to claim 25, wherein the display portion of the visual guidance docking system is mounted adjacent an outside surface of a terminal building and adjacent to the parking space.

* * * * *